United States Patent
Annis et al.

(10) Patent No.: US 6,278,115 B1
(45) Date of Patent: Aug. 21, 2001

(54) X-RAY INSPECTION SYSTEM DETECTOR WITH PLASTIC SCINTILLATING MATERIAL

(75) Inventors: Martin Annis, Cambridge, MA (US); Richard J. Adler; Robert J. Richter-Sand, both of Albuquerque, NM (US)

(73) Assignees: AnnisTech, Inc., Cambridge, MA (US); North Star Research Corporation, Albuquerque, NM (US)

(*) Notice: Subject to any disclaimer, the term of this patent is extended or adjusted under 35 U.S.C. 154(b) by 0 days.

(21) Appl. No.: 09/384,628

(22) Filed: Aug. 27, 1999

Related U.S. Application Data

(60) Provisional application No. 60/098,326, filed on Aug. 28, 1998, and provisional application No. 60/098,333, filed on Aug. 28, 1998.

(51) Int. Cl.$^7$ .................................................. G01T 1/166
(52) U.S. Cl. ........................................ 250/363.01; 378/57
(58) Field of Search .............................. 250/363.01, 367, 250/368; 378/87, 57, 86, 88, 89

(56) References Cited

U.S. PATENT DOCUMENTS

| | | | |
|---|---|---|---|
| 4,503,332 | * 3/1985 | Annis | 250/366 |
| 4,799,247 | * 1/1989 | Annis et al. | 378/87 |
| 4,819,256 | * 4/1989 | Annis et al. | 378/87 |
| 5,493,596 | * 2/1996 | Annis | 378/57 |
| 5,550,378 | * 8/1996 | Skillicorn et al. | 250/367 |
| 5,666,393 | * 9/1997 | Annis | 378/57 |

\* cited by examiner

*Primary Examiner*—David P. Porta
*Assistant Examiner*—Irakli Kiknadze
(74) *Attorney, Agent, or Firm*—Samuels, Gauthier & Stevens, LLP.

(57) ABSTRACT

Transmission and scatter detectors for an x-ray inspection system preferably employing a moving pencil beam comprise a solid plastic scintillating material having a front planar surface that is impinged by incident x-ray energy. The detectors also include light detectors that are cooperatively mounted to the plastic scintillating material to detect photons within the plastic scintillating material created in response to x-rays incident on the front planar surface. The detector may be a transmission detector or a scatter detector. The detectors of the present invention are relatively thin in comparison to prior art detectors, which allows shielding to be reduced. In addition, the detectors of the present invention have a greater efficiency of detection in comparison to the prior art detectors.

11 Claims, 3 Drawing Sheets

X-RAY INSPECTION SYSTEM DETECTOR WITH PLASTIC SCINTILLATING MATERIAL

CROSS REFERENCE TO RELATED APPLICATIONS

This application claims priority from the provisional applications designated Ser. No. 60/098,326 filed Aug. 28, 1998 and entitled "Backscatter Detector", and Ser. No. 60/098,333 filed Aug. 28, 1998 and entitled "Transmission Detector".

GOVERNMENT RIGHTS

This invention was made with government support under Contract DAAB10-95-CA0002 by the U.S. Department of Defense. The government may have certain rights in the invention.

TECHNICAL FIELD

The invention relates to the field of x-ray inspection systems, and in particular to an x-ray detector (e.g., scatter or transmission) comprising solid plastic scintillating material.

BACKGROUND OF THE INVENTION

The detection of contraband (e.g., explosives and drugs) in closed containers is of growing importance worldwide. World events have necessitated tighter screening requirements for the contents of containers placed on aircraft to detect the presence of explosives. In addition, to combat the illegal flow of contraband across national borders, the contents of containers, such as loaded trucks and vehicles must be inspected to check for the presence of narcotics. High energy x-ray inspection systems remain one of the only technologies capable of inspecting loaded cargo containers and vehicles.

There are many detectors used for the detection of x-rays, gamma rays, and charged particles. These detectors typically have unique properties which make them suitable for particular applications. These applications include scintillating screens used in conventional x-ray machines and a variety of single crystal materials used in many nuclear physics applications.

U.S. Pat. No. 4,503,332 discloses a detector suitable for use as a transmission detector in a flying spot x-ray system. This transmission detector uses a thin scintillating screen (or two screens mounted back-to-back) oriented at a grazing angle to the incoming pencil beam of x-rays. The grazing angle allows a long path for the x-ray beam, while the light photons that are produced by the x-ray beam can exit through the thin dimension of the screen. The reason for this geometry is that the scintillating screens have a short attenuation length (of the order of 0.3 mm) for the light photons which are detected by a photo-multiplier tube to form the x-ray image.

This prior art transmission detector works sufficiently well for an x-ray beam with a peak energy in the range 50 to 200 kV. Above this energy this detector design is not efficient for several reasons. First, since the maximum thickness of the scintillating screen is approximately 0.5 mm, the grazing angle must be made as small as possible in order to increase the path length of the x-ray beam in the screen(s). For example, a grazing angle of 3° (on back-toback 0.5 mm screens) results in an x-ray path length of about $(0.1/\tan 30°)$ 2 cm in the scintillating screen. This path length is sufficient to detect about 40% of the x-rays at an energy of 500 kV. Second, the x-ray pencil beam typically has a cross section of about 3 cm ×3 cm as it enters the transmission detector. Thus, the depth of the detector must be at least $(3/\tan 3°)$ 60 cm, or approximately two feet for the transmission detector. Significantly, a transmission detector of this depth requires a significant amount of heavy shielding (e.g., lead), which increases the cost and the size of the system.

Prior art scatter detectors are also inefficient at high energy. For example, conventional scatter detectors use a thin scintillating screen mounted on the front face of the detector. Alternatively, the thin scintillating screen may be mounted on another of the other five faces of a rectangular detector embodiment. In either of these embodiments the other five faces of the rectangular detector are covered with a light reflecting material. The scatter detector must be of an area large enough to subtend a large solid angle at each point along the line where the primary pencil beam of x-rays interacts to produce a cone of scattered x-rays. As known, the maximum thickness of the scintillating screen is about 0.5 mm. Above this thickness the visible light produced by the x-rays can not escape from the scintillating screen. This detector design has proven acceptable for systems that employ an x-ray beam with a peak energy in the range of 50–150 kV. For an energy of the x-ray photon of 100 kV, the efficiency of the screen to stop and detect this photon is approximately 40%. However, for an energy of the x-ray photon of about 200 kV, the efficiency of the screen to stop and detect this photon is only 8%. The efficiency decreases further at higher energies of the x-ray photons.

Therefore, there is a need for an improved x-ray detector for a high energy x-ray inspection system.

SUMMARY OF THE INVENTION

Briefly, according to the present invention, a detector for an x-ray inspection system utilizing a pencil beam comprises a solid plastic scintillating material having a front planar surface that is inpinged by x-ray energy. The detector also includes a light detector that is cooperatively mounted to the plastic scintillating material to detect photons within the plastic scintillating material created in response to x-rays incident on the front planar surface.

The detector may be a transmission detector or a scatter detector.

Advantageously, the detector of the present invention is relatively thin in comparison to prior art detectors, which allows the shielding to be reduced. In addition, the detector of the present invention has a greater efficiency of detection.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
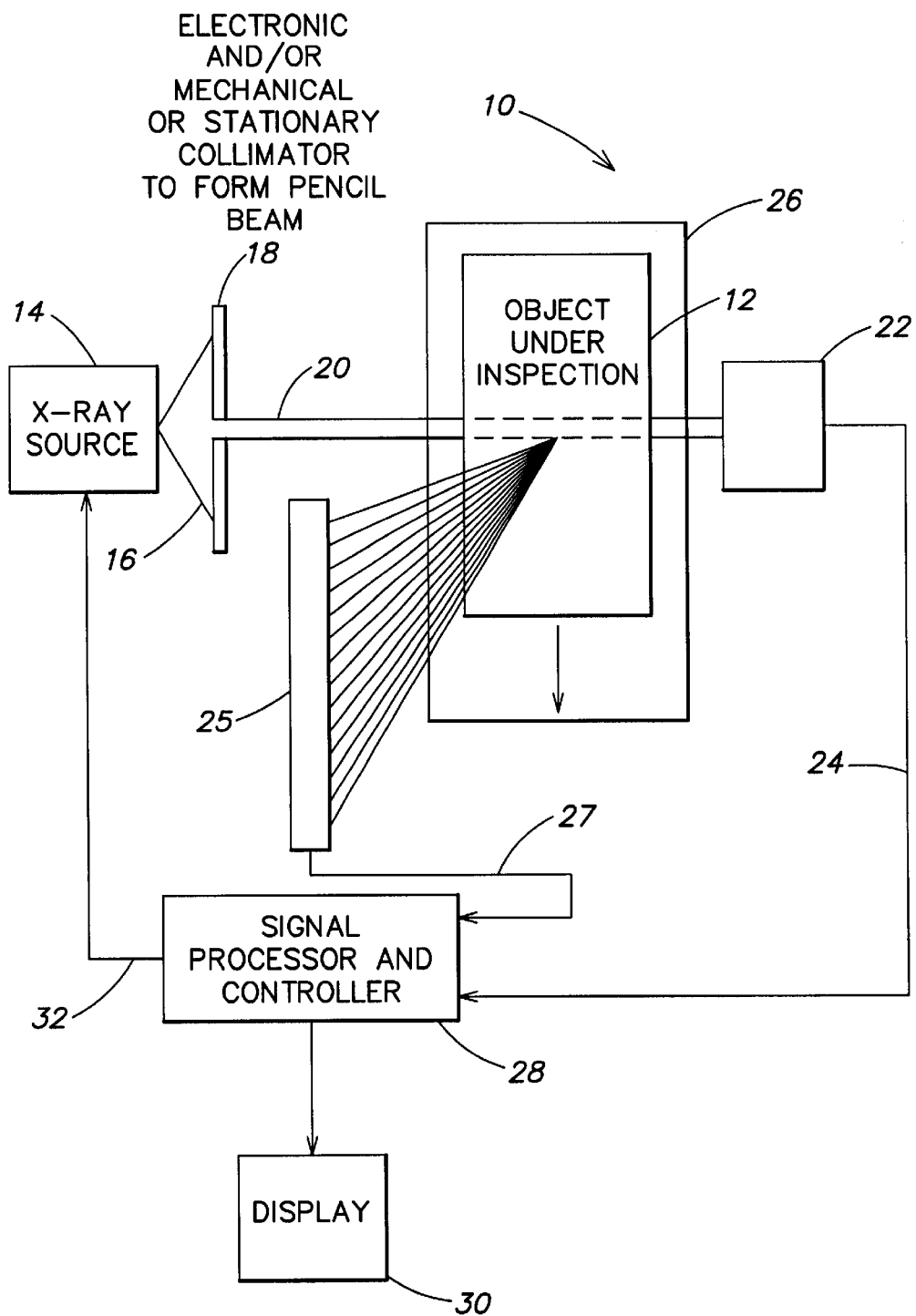
FIG. 1 is a functional a block diagram of a high energy X-ray inspection system utilizing a scanning pencil beam.

FIG. 1 illustrates a functional block diagram of a high energy X-ray inspection system 10 for inspecting the contents of an object under inspection 12 (e.g., a shipping container). The system 10 includes an x-ray source 14, such as an x-ray tube, a linear accelerator of electrons plus an x-ray target, or a radioactive source such as Cobalt-60. The source 14 includes a mechanical or fixed collimator to provide a cone of x-rays 16 to a rotating collimator 18 that reduces the cone of x-rays 16 to a moving pencil beam of x-rays 20. Alternatively, a high energy source of electrons may be sequentially deflected magnetically along a long x-ray target. A stationary collimator with multiple slots mounted above the x-ray target then forms the moving pencil beam of x-rays.

The pencil beam 20 strikes the object under inspection 12, and the x-rays which pass directly through the object are detected by a transmission detector 22 comprising a single long detector (not shown in figure) that provides signals on a line 24 indicative of detected photons. The system also includes a scatter detector 25 (e.g., a back scatter detector), which provides signals on a line 27. A conveyer system 26 moves the object under inspection transversely (e.g., perpendicularly) through the vertically scanning pencil beam of x-rays.

A signal processor and controller 28 receives the detected signals on the lines 24 and 27, processes the signals, and displays image data on display(s) 30 indicative of the interior of the object under inspection. If the x-ray source 14 is an electronic source, the signal processor and controller 28 provides a control signal on a line 32 to the source. X-ray sources and collimators are all well known in the art, and in the interest of brevity those details shall not be repeated herein. The details of the scatter detector 25 and transmission detector 22 shall now be discussed.

Figure 2:
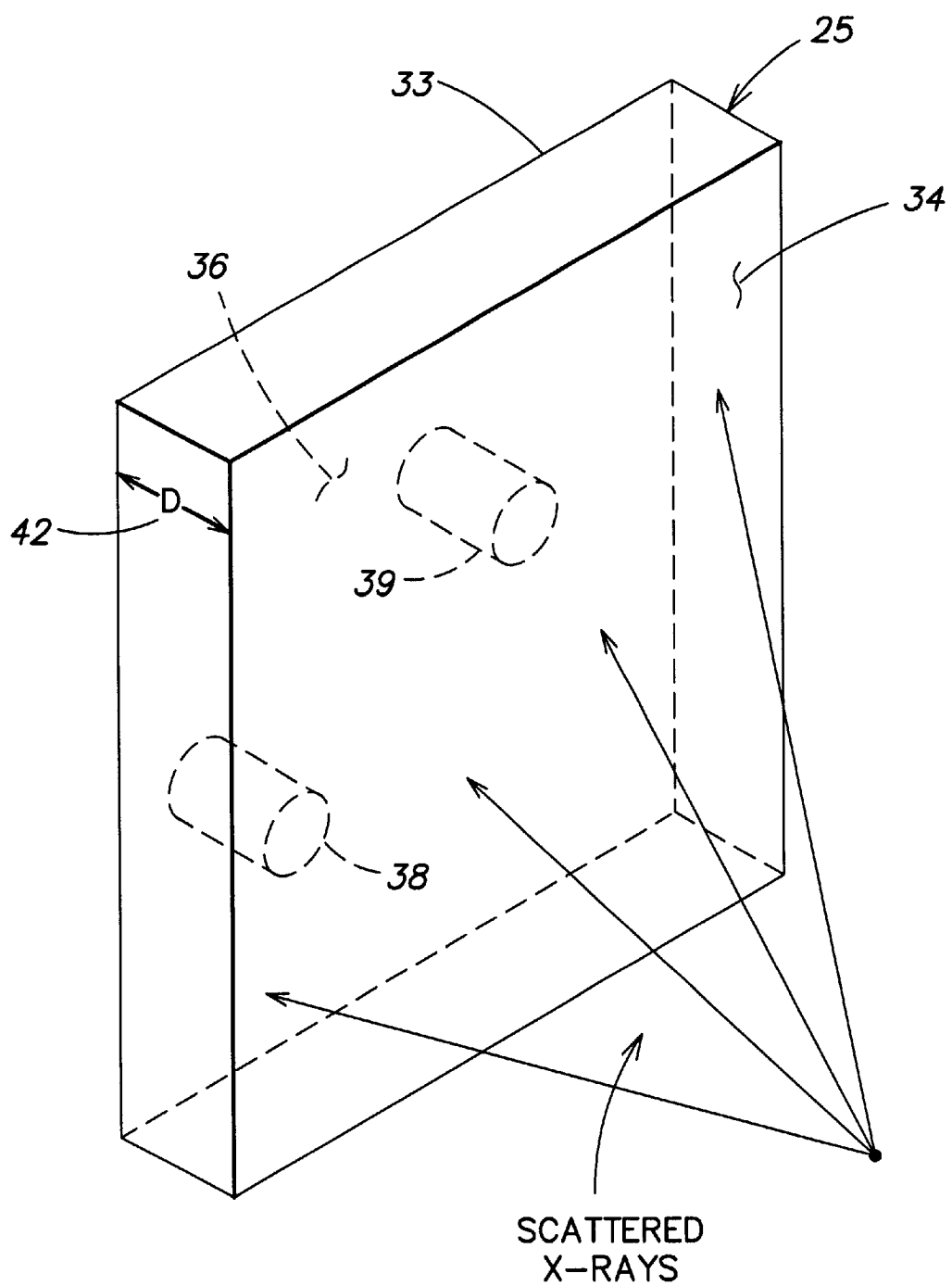
FIG. 2 is a simplified illustration of a scatter detector according to the present invention.

FIG. 2 is a simplified illustration of the scatter detector 25 according to an aspect of the present invention. The scatter detector 25 includes solid plastic scintillating material 33 having a front planar surface 34 that is impinged by incident x-ray energy, and a back planar surface 36 that is preferably parallel to the front planar surface 34. Plastic scintillating material is commercially available from a number of companies, including the Bicron division of Saint-Gobain/Norton Industrial Plastics Corporation, Newbury, Ohio.

The scatter detector 25 also includes a plurality of photomultipliers tubes (PMTs) 38–39 that are mounted in face-to-face contact with the back planar surface 36. The PMTs may be collectively mounted within a light tight support frame (not shown) that is adjacent to the plastic scintillating material to detect photons within the plastic scintillating material. The support frame may also hold the plastic scintillating material. PMTs are commercially available from a number of manufacturers, including Hamamatsu Corporation of Bridgewater, N.J.

The features which make this solid plastic scintillating material desirable for use in an xray inspection is its relatively low cost in comparison to other materials that have been conventionally considered by one of ordinary sill in the art (e.g., scintillating screen detectors). In addition, plastic scintillating material can be conveniently shaped into the required large areas (e.g., areas on the order of 1 ft.$^2$ to 100 ft$^2$). Furthermore, the plastic material has a low visible light attenuation over a sufficiently long distance to make it usable in large volume applications. The plastic scintillator also has an extremely short rise time and decay time, inking it suitable for applications where there is little time available for the collection of data and the data acquisition interval is short. In addition, the scintillator efficiently transports the light to the PMTs because of the internal reflections.

The scatter detector preferably has a depth D 42 that is at least about one-tenth of the mean free path length of the scattered x-rays. For example, for high energy embodiments above 150 kV the depth of the scatter detector is preferably at least about 1.5 inches. Significantly, the efficiency of detection of this thin scatter detector is about 40% for an x-ray photon of 200 kV in comparison to an efficiency of detection of about 8% for the prior art scintillating screen detectors. In addition, at an x-ray energy of about 600 kV, the efficiencies are approximately 26% for the plastic scintillator detector and only about 1% for the prior art scintillating screen detector. Furthermore, prior art scintillating screen scatter detectors are undesirably quite thick (i.e., about one foot).

Figure 3:
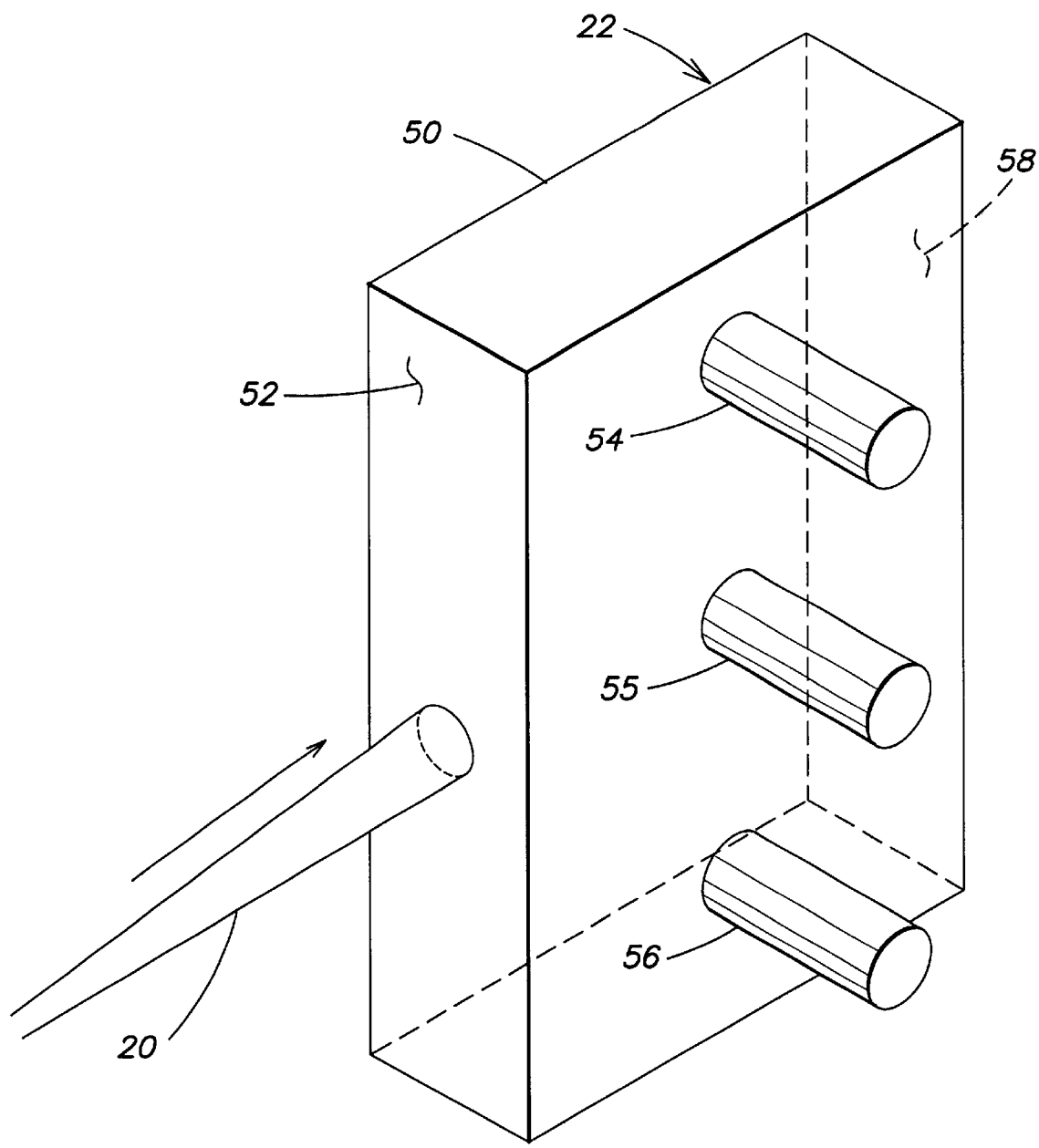
FIG. 3 is a simplified illustration of a transmission detector according to the present invention.

FIG. 3 is a simplified illustration of the transmission detector 22. The transmission detector 22 includes solid plastic scintillating material 50 having a planar surface 52 that is impinged by the scanning pencil beam 20, which has passed through the object under inspection (see FIG. 1). The transmission detector 22 is oriented so the pencil beam impinges on a long sidewall of the plastic scintillating material 50. As set forth above, plastic scintillating material is commercially available from a number of companies, including the Bicron division of Saint-Gobain/Norton Industrial Plastics Corporation, Newbury, Ohio.

The pencil beam 20 is preferably smaller in lateral dimension than the edge dimension of the scintillator for several reasons. First, if the pencil beam were to displace laterally off the detector (because of poor alignment) as it moves vertically, the efficiency of collection of the visible light produced by the x-rays would be adversely effected. Second, all the x-rays that traverse the object are detected, thus the x-rays are efficiently utilized and there are no excess x-rays that must be shielded.

The transmission detector 22 includes a plurality of PMTs 54–56 mounted in face-to-face contact with the solid plastic scintillating material 50. The PMTs 54–56 may be collectively mounted within a light tight support frame (not shown) that is adjacent to the scintillating material 50 in order to detect the photons within the plastic scintillating material. As shown, the PMTs may be mounted face-to-face against a sidewall at an angle (e.g., perpendicular) to the impinging pencil beam. However, the PMTs may also be mounted against a back planar surface 58, or at the ends of the plastic scintillator.

Significantly, the depth of the plastic scintillator for the transmission detector (preferably about six inches to detect x-rays of 1 MV) allows an efficiency of detection of approximately 60%, in comparison to an efficiency of about 11% for the prior art scintillating screen at grazing incidence. The prior art grazing incidence screen detector, by necessity, is about two feet deep and two feet across (excluding shielding and the PMTs), while a transmission detector according to the present invention capable of bandling the same energy is only six inches deep and two inches across.

Although the detectors of the present invention have been discussed in the context of using PMTs as the light detecting element, one of ordinary skill will recognize that other light detectors such as photodiodes may also be used. In addition, although rectangular detector designs have been presented for ease of illustration, it is contemplated that detectors of other shapes may also be utilized. Notably, the plastic scintillating material can be molded into virtually any shape. Furthermore, although the PMTs in the transmission detector 22 (FIG. 3) are illustrated as cooperatively mounted to the sidewall of the scintillating material, it is contemplated that the PMTs may be mounted in other locations adjacent to the scintillating material. In addition, it is contemplated that the transmission detector may be utilized in an x-ray inspection system employing a fan beam.

Although the present invention has been shown and described with respect to several preferred embodiments thereof, various changes, omissions and additions to the form and detail thereof, may be made therein, without departing from the spirit and scope of the invention.

What is claimed is:

1. A detector for an x-ray inspection system utilizing a pencil beam, comprising:
   a solid plastic scintillating material having a front planar surface that is impinged by x-ray energy; and
   a means cooperatively mounted to said plastic scintillating material for detecting photons within said plastic scintillating material created in response to x-rays incident on said front planar surface.

2. The detector of claim 1, wherein (i) said plastic scintillating material includes a back planar surface that is parallel to said front planar surface, (ii) said means for detecting are cooperatively mounted to said back planar surface, and (iii) said front planar surface and said back planar surface are located in parallel planes separated by a distance of several inches.

3. The detector of claim 2, wherein said detector is configured as a scatter detector.

4. The detector of claim 2, wherein said detector is configured as a transmission detector.

5. The detector of claim 2, wherein said means for detecting comprises a plurality of photomultiplier tubes.

6. The detector of claim 2, wherein said means for detecting comprises a plurality of photodiodes.

7. The detector of claim 1, wherein (i) said plastic scintillating material includes a back planar surface that is parallel to said front planar surface, (ii) said means for detecting are cooperatively mounted to said back planar surface, and (iii) said front planar surface and said back planar surface are located in parallel planes separated by a distance of less than about one meter.

8. A scatter detector for an x-ray inspection system, comprising:
   a solid plastic scintillating material having a front planar surface that is impinged by incident x-ray energy, and a back planar surface that is parallel with said front planar surface, wherein said front and back planar surfaces represent a thickness dimension of said scintillating materials and are separated by a distance of at least about one tenth of the x-ray mean free path length; and
   a means cooperatively mounted to said plastic scintillating material for detecting photons within said plastic scintillating material created in response to x-rays striking said front planar surface.

9. The detector of claim 8, wherein said front planar surface and said back planar surface are separated by a distance of several inches.

10. The detector of claim 9, wherein said means for detecting comprises a plurality of photomultiplier tubes that are cooperatively mounted to said back planar surface to detect photons within said plastic scintillating material created in response to x-rays striking said front planar surface.

11. A transmission detector for an x-ray inspection system utilizing a pencil beam, comprising:
    a solid plastic scintillating material having a front planar surface that is impinged by incident x-ray energy; and
    a means cooperatively mounted to said plastic scintillating material for detecting photons within said plastic scintillating material created in response to x-rays incident on said front planar surface.

* * * * *

UNITED STATES PATENT AND TRADEMARK OFFICE
CERTIFICATE OF CORRECTION

| | |
|---|---|
| PATENT NO. | : 6,278,115 B1 |
| DATED | : August 21, 2001 |
| INVENTOR(S) | : Martin Annis, Richard Adler and Robert J. Richter-Sand |

It is certified that error appears in the above-identified patent and that said Letters Patent is hereby corrected as shown below:

<u>Column 1,</u>
Line 16, in the "GOVERNMENT RIGHTS" section, replace "Contract DAAB10-95-CA0002" with -- Contract DAAB10-95-C-0002 --

Signed and Sealed this

Twenty-third Day of November, 2004

JON W. DUDAS
*Director of the United States Patent and Trademark Office*